US008971510B2

(12) United States Patent
Davidson et al.

(10) Patent No.: US 8,971,510 B2
(45) Date of Patent: Mar. 3, 2015

(54) MOBILE BROWSING

(75) Inventors: Brian James Davidson, Woking (GB); Steven Andrew Mote, Musgrove (GB); Robert Clifford Newstead, Frimley (GB); Ronald J. Lander, Calabasas, CA (US); David Fisher, London (GB)

(73) Assignee: Nokia Corporation, Espoo (FI)

( * ) Notice: Subject to any disclaimer, the term of this patent is extended or adjusted under 35 U.S.C. 154(b) by 673 days.

(21) Appl. No.: 12/785,137

(22) Filed: May 21, 2010

(65) Prior Publication Data

US 2010/0226581 A1 Sep. 9, 2010

Related U.S. Application Data

(63) Continuation of application No. 09/920,888, filed on Aug. 3, 2001.

(51) Int. Cl.
 *H04M 3/42* (2006.01)
 *H04W 4/00* (2009.01)
 *G06F 17/30* (2006.01)
 *H04W 4/02* (2009.01)
 *H04W 4/18* (2009.01)
 *H04L 29/08* (2006.01)

(52) U.S. Cl.
 CPC ............ *H04W 4/00* (2013.01); *G06F 17/30867* (2013.01); *G06F 17/3087* (2013.01); *G06F 17/30899* (2013.01); *H04W 4/02* (2013.01); *H04W 4/185* (2013.01); *H04L 67/30* (2013.01); *H04L 67/04* (2013.01); *H04L 67/18* (2013.01); *H04L 69/329* (2013.01); *H04L 67/306* (2013.01); *H04L 67/02* (2013.01)
 USPC ............... 379/201.05; 379/201.09; 455/414.2

(58) Field of Classification Search
 USPC ................. 379/100.02, 88.13, 88.26, 201.05, 379/201.06, 201.09; 455/412.1, 422.1, 564, 455/3.06; 705/23; 235/462.01; 709/217
 See application file for complete search history.

(56) References Cited

U.S. PATENT DOCUMENTS

| | | | | |
|---|---|---|---|---|
| 6,512,919 | B2 * | 1/2003 | Ogasawara | 455/422.1 |
| 7,089,291 | B1 * | 8/2006 | Philyaw | 709/217 |
| 2002/0195495 | A1 * | 12/2002 | Melick et al. | 235/462.01 |

OTHER PUBLICATIONS

European Search Report for European Patent Application No. 10168938.8, dated Aug. 12, 2010.
Kindberg et al., "A Web-Based Nomadic Computing System," *Computer Networks*, vol. 35, No. 4, Mar. 2001, pp. 443-456.
Communication from the European Patent Office for European Patent Application No. 10168938.8, dated Jun. 22, 2011.

* cited by examiner

*Primary Examiner* — Md S Elahee
(74) *Attorney, Agent, or Firm* — Alston & Bird LLP

(57) ABSTRACT

The present invention resides in one aspect in a system including a user operable portable radio communication device and a server. The invention includes the portable radio communication device comprising a sensor adapted to allow automatic input of data to the portable radio communication device, a controller for controlling the device, a browser adapted to download content from the server, the controller being arranged to be responsive to data input via said sensor so as control the browser to download content from a server associated with the input data, means for providing for information personal to a user, and contextualization means configured to contextualize the downloaded content with the personal information.

21 Claims, 5 Drawing Sheets

MOBILE BROWSING

CROSS-REFERENCE TO RELATED APPLICATIONS

This application is a continuation of U.S. application Ser. No. 09/920,888, filed Aug. 3, 2001, which is hereby incorporated herein in its entirety by reference.

BACKGROUND OF THE INVENTION

1. Field of the Invention

The present invention relates to mobile communications and in particular to mobile browsing.

2. Description of the Prior Art

With the advent of mobile browsing services, such as WAP and iMODE, a user of a portable radio communication device (such as a mobile phone) has the facility to download information from WAP and iMODE servers while being on the move. In addition, the continuing emergence of technologies such as GPRS, HSCSD and 3G, support higher data delivery rates heightening the attraction, utility and demand for mobile browsing.

SUMMARY OF THE INVENTION

Against this background, the present invention resides in one aspect in a system including a user operable portable radio communication device and a server, the portable radio communication device comprising a sensor which allows automatic input of data to the portable radio communication device, a controller for controlling the device, a browser which downloads content from the server, the controller being arranged to be responsive to data input via said sensor to control the browser to download content from a server associated with the input data, means for providing for information personal to a user, and contextualization means configured to contextualize the downloaded content with the personal information.

An advantage of the invention is that there is provided a portable radio communication device that can be utilized by an end user in a manner that enables downloaded information/content to be combined with information, data and content specific to the end user. More specifically, the provision of the contextualization means allows a user to merge personal information with information of a more general and public nature. This offers a new and powerful way of using information from for example the internet.

In another aspect the present invention comprises a system including a user operable portable radio communication device and an object device connected to a network, the portable radio communication device comprising a transmitter for transmitting an identity tag indicative of the identity of the portable radio communication device, the object device comprising a receiver, and a processor, the system in response to the receiver receiving an identity tag transmitted from a portable radio communication device, the processor authorizing the downloading of information via the network to a remote server or terminal in accordance with address information associated with the identity tag.

An advantage of this arrangement is that an end user only has to carry a small, passive device by which the user can request that specified items of information e.g. relating to a website, are downloaded to a terminal such as a PC belonging to the user. In this way, the user can use the information when at a terminal and has the time to do so.

BRIEF DESCRIPTION OF THE DRAWINGS

In order to aid a more detailed understanding of the present invention, various embodiments of the invention will now be described. These should not be construed as limiting the invention and are merely examples of specific ways of putting the invention into effect. In particular, the invention will be described with reference to the accompanying drawings in which.

DETAILED DESCRIPTION OF THE INVENTION

Referring to FIGS. 1, 2, 3 and 4 of the accompanying drawings, there is shown an embodiment of the present invention comprising a handheld portable radio communication device (10) that is operable to communicate with a network. The portable radio communication device (10) is provided with an input means (12) which allows the input of data to the device by scanning or other data gathering technologies without the user having to input the data into the device manually. The input means may be optical in nature, e.g. by way of Optical Character Recognition (OCR), infrared (I.R.) scanning, barcode scanning or Optical Shape Recognition (OSR), or it may be by way of low power RF such as Bluetooth. Connected to the input means (12) is an interpreter (14) which reads the input data, interprets the input data and produces an output indicative of some identifying means of the scanned item such as an address e.g. an internet website address. This may be achieved by means of an on-board look-up table or other database, or by reference to a distributed database.

Figure 1A:
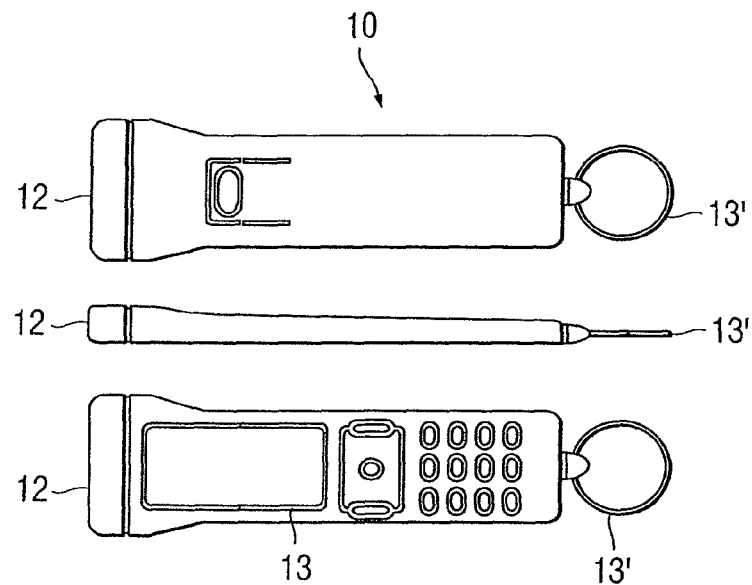
FIGS. 1a and 1b illustrate one embodiment of the present invention.
Figure 1B:
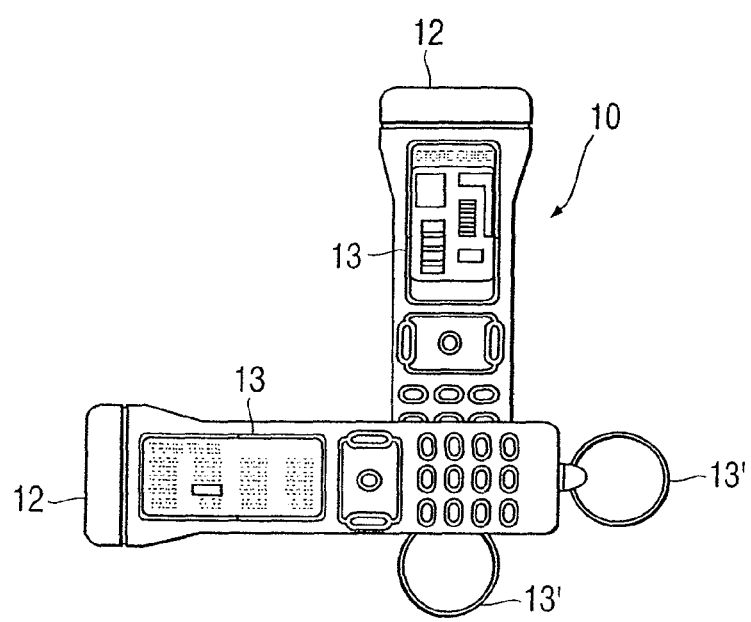
Figure 2:
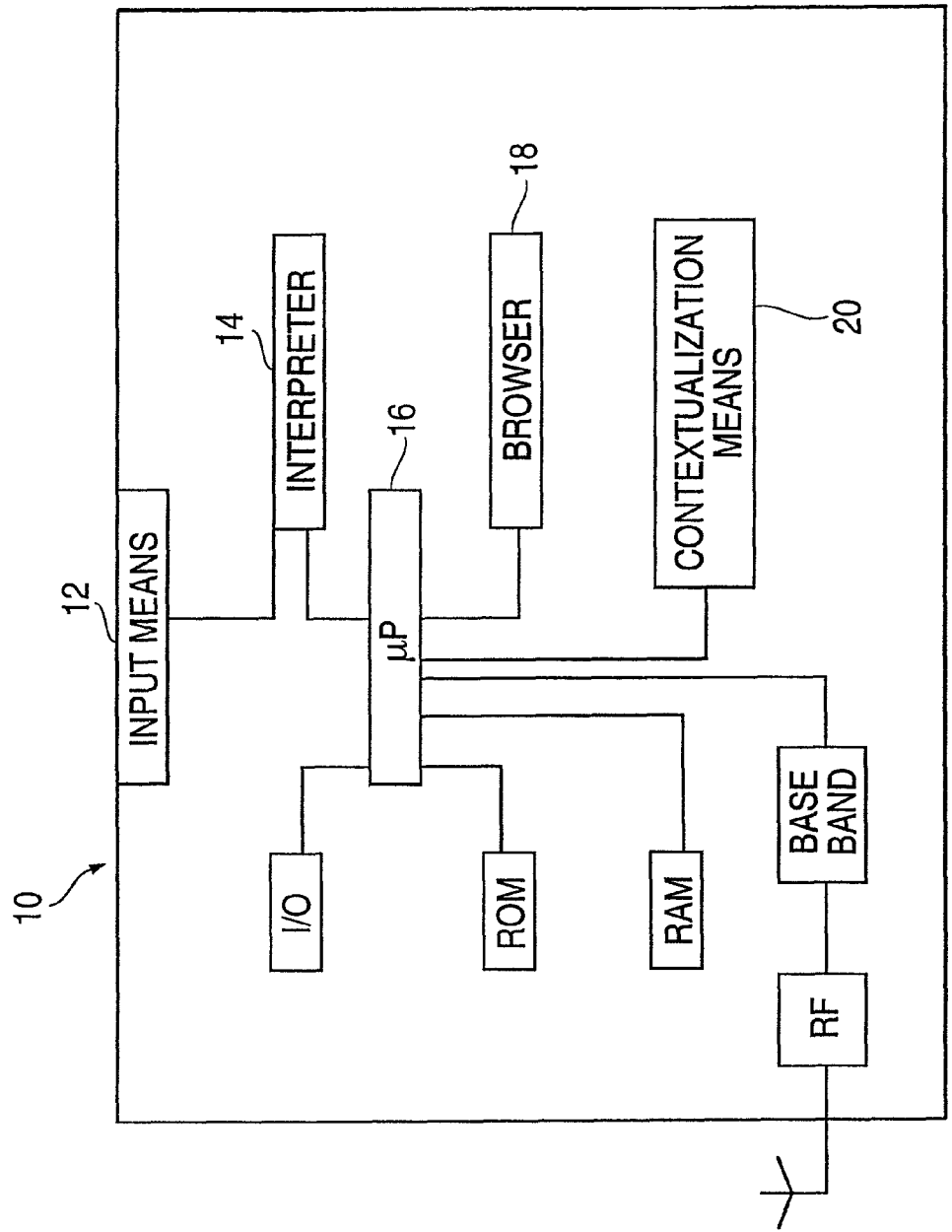
FIG. 2 provides a schematic representation of the architecture of the embodiment of FIG. 1.

FIG. 1a illustrates from top to bottom, back, side and top views of the communication device (10) including a display (13) and belt loop (13') and FIG. 1b illustrates the communication device in a horizontal and vertical orientation with the display (13) displaying different text.

Figure 4:
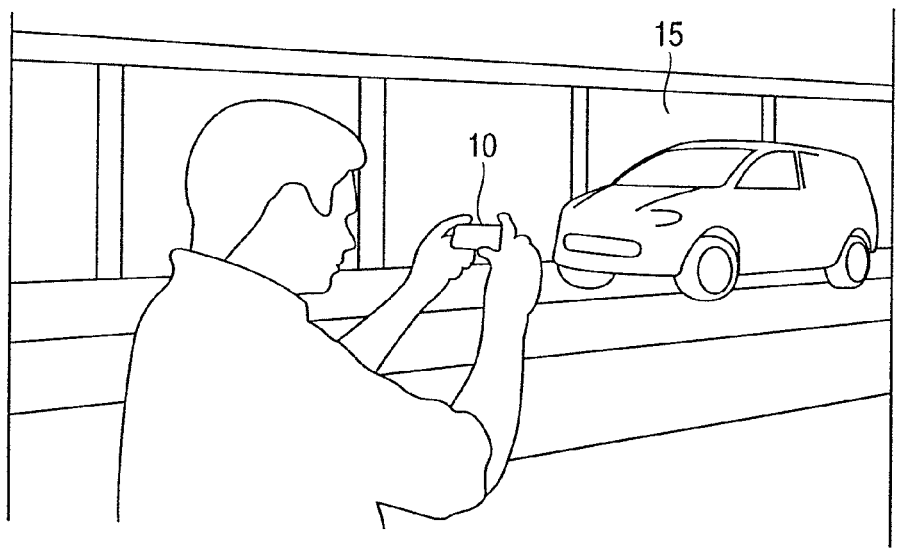
FIG. 4 illustrates the embodiment of FIG. 1 in a second use.
Figure 3:
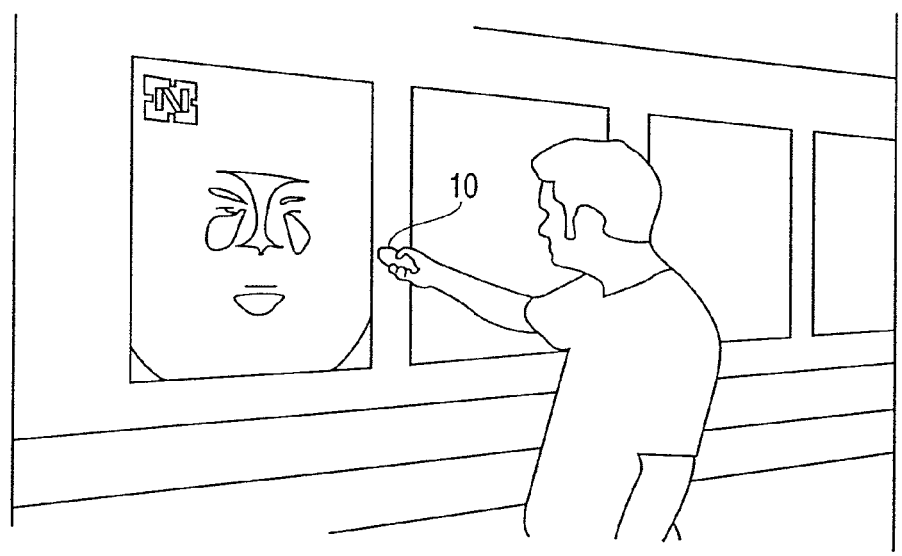
FIG. 3 illustrates the embodiment of FIG. 1 in one use.

In preferred arrangements of the present invention, advertisements, whether on posters in public places (as illustrated in FIG. 3) or printed in magazines (not illustrated) which carry I.R. or Barcoded links to further information are inputted by the input means (12). Additionally, full Optical Shape Recognition enables the user of the communication device (10) to interrogate logos, badges and trademarks (15) (as illustrated in FIG. 4).

The identification of a website address outputted by the interpreter prompts the device's microprocessor (16) to launch the on-board browser (18) so as to enable the portable device to access the remote server using the website address. Information and content relating to the scanned item is thus downloaded to the user's portable device.

The portable device is also provided with contextualization means (20) which is configured to process downloaded data in a way that allows that data to be combined with data of a personal nature. The contextualization means (20) is controlled by the microprocessor (16) and is configured to allow the user to merge data, information or content which is downloaded from the internet with personal data. The contextualization means is preferably implemented in software which associates personal information of the user of communication device (10) with information retrieved from an external server (not illustrated) which may be associated with any information provider such as but not limited to the internet. For example, as the user personalizes the data stored on the device (or in an on-line database), the device could be used to overlay images personal to the user (the user's living room, car, or personal photograph) with images captured in the real world or downloaded from persons on the internet. This would enable the portable device to be used as a 'personal dresser', allowing the user to 'try on' clothes or visualize furniture in his home.

Figure 5:
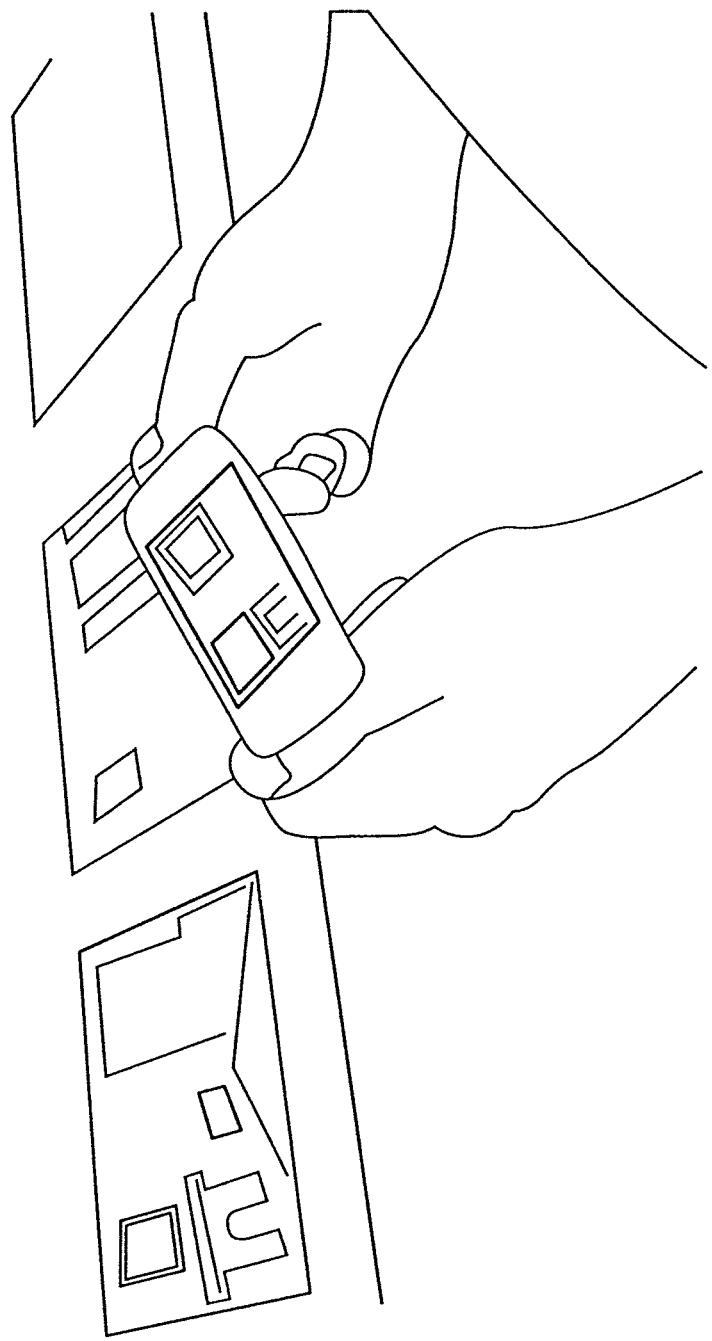
FIG. 5 illustrates the embodiment of FIG. 1 in a third use.

FIG. 5 illustrates a further use of the personal device in which content is accessed by scanning a picture or a barcode in a catalog. The information is downloaded to the personal device and inputted to the contextualization means (20). The contextualization means (20) allows the user to merge downloaded data with personal data.

The personal device may be configured to interface with local area networks (LANs) and wireless local area networks (WLANs) for example in shops and in this arrangement the contextualization means (20) is configured to bring together user preferences with in-store offers tailored to that specific user, e.g. offers may appear on the personal device display at the instant the user is passing a particular product. The user may have programmed in the user preferences before the user sets out on the shopping trip. The user may also initiate downloading by accessing the LAN or WLAN for information which is then used by the contextualization means (20) along with personal data.

Another form of the present invention makes use of the Global Positioning System (GPS). In this form of the invention, the personal device is equipped with a GPS receiver thereby enabling the user to access location specific information and review data that may have been accessed when last at that particular location. The contextualization means (20) is used in this embodiment of the invention in a way that data personal of the user is used and associated with the particular location of the user. For instance in the form of a reminder message relating to the particular location of the user as for example disclosed in assignee's co-pending UK Patent Application number GB 0116140.5

Figure 6:
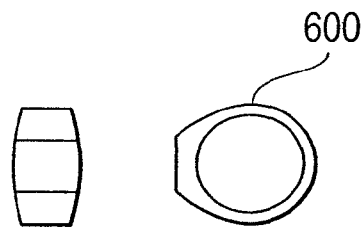
FIG. 6 illustrates a further embodiment of the invention.
Figure 7:
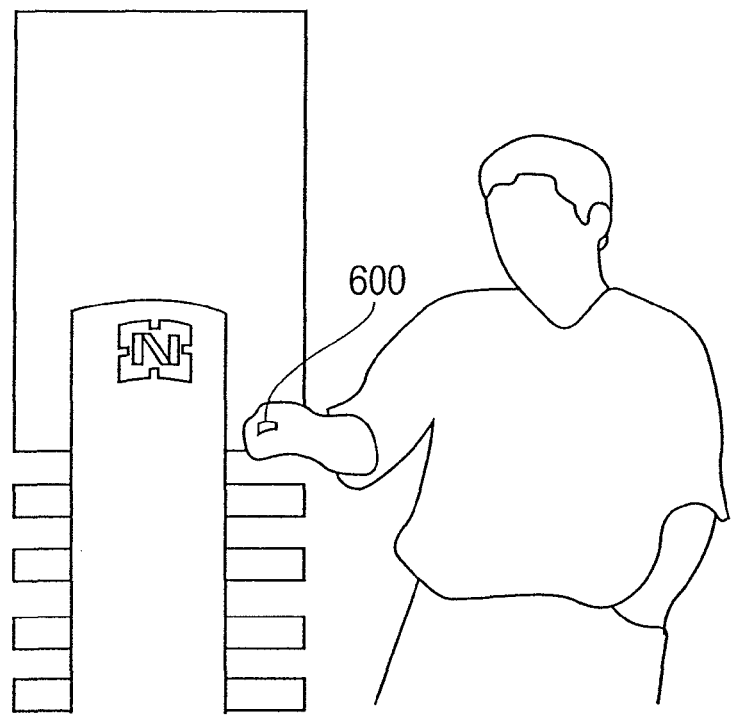
FIG. 7 shows the embodiment of FIG. 6 in one use.

In FIG. 6 there is shown side and end views of a further embodiment of the present invention which comprises a small passive personal device (600) which the user possesses at all times and which conveniently may be used as a form of electronic identity for the user. In this embodiment of the invention, the personal device is used by the user to request/authorize the downloading of information from an object device to some other specified terminal such as the user's home computer. This embodiment allows the user to capture information while on the move, in particular information that may be all around the user on various objects and items but which may not have the time to review at that particular moment. The embodiment benefits in that many forms of information such as advertising increasingly offer supplementary details on an associated internet websites which can be reviewed by the user when more time to do so is available. In this embodiment the portable device is provided with an identity means and as the user is moving around the environment and when a website is found of interest, the user may request/authorize the downloading of the website address to a home PC using the identity means. So for example if the user sees a website address on an advertisement (such as illustrated in FIG. 7) and wishes to have more information about the product/service being advertised, then the user transmits from the personal device an identity tag identifying the personal device to the advertisement. The advertisement is equipped with a receiver that receives the identity tag and registers the identity tag in a memory of the advertisement. The advertisement is connected to the network so that the user's registered identity is used as a means of addressing for the information to be downloaded. In this way, the user is always connected to the wider electronic world even when his/her more capable devices are absent. A further feature of this embodiment is that it may be used in conjunction with a larger personal portable device such as that illustrated in FIGS. 1 to 5 in a way that it requires the proximity of the passive personal device in order to enable the larger portable device. This provides security for the user in that if the larger portable device is not within range of the smaller personal device then the larger device is disabled.

Thus the invention provides for user control and interaction of public data with personal data.

In the context of the present invention, the term network as used herein covers all types of networks including cellular networks, IP networks, the internet, LANs, WLANs etc.

In view of the foregoing, it should be appreciated that the present invention may be embodied in other specific forms without departing from its essential attributes.

Furthermore, each feature disclosed in this specification and/or shown in the drawings may be incorporated in the invention independently of other disclosed and/or illustrated features. In this regard, the invention includes any novel feature or combination of features disclosed herein either explicitly or any generalization thereof.

What is claimed is:

1. A method comprising:
receiving, at a portable device, input data in response to an optical data gathering operation being performed on an object;
causing interpretation of the input data to determine a website address associated with the object based on an identity of the object or indicia of the identity of the object, the website address being determined using, at least in part, an on-board lookup table or other on-board database of the portable device; and
initiating access to a remote server using the website address to retrieve information or content relating to the object.

2. The method of claim 1, wherein receiving the input data comprises utilizing optical character recognition or optical shape recognition to detect data providing indicia of the identity of the object.

3. The method of claim 1, wherein receiving the input data comprises utilizing infrared scanning, barcode scanning, or low power radio frequency scanning to detect data providing indicia of the identity of the object.

4. The method of claim 1, further comprising accessing location specific information relating to a current location of the portable device.

5. The method of claim 4, wherein accessing location specific information further comprises reviewing data accessed when the portable device was previously at the current location.

6. The method of claim 1, wherein receiving the input data comprises receiving an input responsive to the optical data gathering operation being performed on an image associated with the object.

7. The method of claim 1, further comprising combining the information retrieved with personal data associated with a user of the portable device.

8. The method of claim 7, wherein combining the information retrieved with personal data comprises combining the information retrieved with data relating to the current location of the user.

9. The method of claim 7, wherein at least one of the information retrieved or the personal data comprises at least one image, and wherein combining the information retrieved with personal data comprises overlaying the at least one image with the information retrieved or the personal data.

10. The method of claim 1, further comprising accessing location specific information relating to a current location of the portable device to provide a reminder message to a user of the portable device, the reminder message relating to the current location.

11. An apparatus comprising at least one processor and at least one memory including computer program code, the at least one memory and the computer program code configured to, with the processor, cause the apparatus to at least:
receive, at a portable device, input data in response to an optical data gathering operation being performed on an object;
cause interpretation of the input data to determine a website address associated with the object based on an identity of the object or indicia of the identity of the object, the website address being determined using, at least in part, an on-board lookup table or other on-board database of the portable device; and
initiate access to a remote server using the website address to retrieve information or content relating to the object.

12. The apparatus of claim 11, wherein the memory and computer program code are configured to, with the processor, cause the apparatus to receive the input data by utilizing optical character recognition or optical shape recognition to detect data providing indicia of the identity of the object.

13. The apparatus of claim 11, wherein the memory and computer program code are configured to, with the processor, cause the apparatus to receive the input data by utilizing infrared scanning, barcode scanning, or low power radio frequency scanning to detect data providing indicia of the identity of the object.

14. The apparatus of claim 11, wherein the memory and computer program code are further configured to, with the processor, cause the apparatus to access location specific information relating to a current location of the portable device.

15. The apparatus of claim 11, wherein the memory and computer program code being configured to, with the processor, cause the apparatus to access location specific information further includes causing the apparatus to review data accessed when the portable device was previously at the current location.

16. The apparatus of claim 11, wherein the memory and computer program code are configured to, with the processor, cause the apparatus to receive the input data by receiving an input responsive to interrogation of an image associated with the object.

17. The apparatus of claim 11, wherein the memory and computer program code are further configured to, with the processor, cause the apparatus to combine the information retrieved with personal data associated with a user of the portable device.

18. The apparatus of claim 17, wherein the memory and computer program code are configured to, with the processor, cause the apparatus to combine the information retrieved with personal data by combining the information retrieved with data relating to the current location of the user.

19. The apparatus of claim 17, wherein at least one of the information retrieved or the personal data comprises at least one image, and wherein the memory and computer program code are configured to, with the processor, cause the apparatus to combine the information retrieved with personal data by combining overlaying the at least one image with the information retrieved or the personal data.

20. The apparatus of claim 11, wherein the memory and computer program code are further configured to, with the processor, cause the apparatus to access location specific information relating to a current location of the portable device to provide a reminder message to a user of the portable device, the reminder message relating to the current location.

21. The apparatus of claim 11, wherein the apparatus is a mobile terminal and further comprises user interface circuitry configured to facilitate user control of at least some functions of the mobile terminal.

* * * * *